(12) United States Patent
Kienig et al.

(10) Patent No.: US 12,464,333 B2
(45) Date of Patent: Nov. 4, 2025

(54) DEVICE PERFORMING COMMUNICATION AND METHOD FOR OPERATING THE SAME

(71) Applicant: Samsung Electronics Co., Ltd., Suwon-si (KR)

(72) Inventors: Jan Kienig, Warsaw (PL); Przemyslaw Wyszkowski, Warsaw (PL); Rafal Gibas, Warsaw (PL)

(73) Assignee: Samsung Electronics Co., Ltd., Suwon-si (KR)

( * ) Notice: Subject to any disclaimer, the term of this patent is extended or adjusted under 35 U.S.C. 154(b) by 837 days.

(21) Appl. No.: 17/457,380

(22) Filed: Dec. 2, 2021

(65) Prior Publication Data

US 2022/0337991 A1    Oct. 20, 2022

Related U.S. Application Data

(63) Continuation of application No. PCT/KR2021/016339, filed on Nov. 10, 2021.

(30) Foreign Application Priority Data

Apr. 15, 2021    (KR) .................. 10-2021-0049111

(51) Int. Cl.
*H04W 8/06*         (2009.01)
*H04W 48/18*        (2009.01)
*H04W 60/04*        (2009.01)

(52) U.S. Cl.
CPC ............. *H04W 8/06* (2013.01); *H04W 48/18* (2013.01); *H04W 60/04* (2013.01)

(58) Field of Classification Search
None
See application file for complete search history.

(56) References Cited

U.S. PATENT DOCUMENTS

2017/0303259 A1    10/2017    Lee et al.
2018/0332523 A1    11/2018    Faccin et al.
(Continued)

FOREIGN PATENT DOCUMENTS

CN       112512100 A        3/2021
EP         3402232 A1 *    11/2018    ............ H04W 16/02
(Continued)

OTHER PUBLICATIONS

S2-177320_TS 23.501_SA WG2 Meeting 123_23—Oct. 27, 2017 (Year: 2017).*
(Continued)

*Primary Examiner* — Jinsong Hu
*Assistant Examiner* — Alexander J Yi

(57) ABSTRACT

Various embodiments of the disclosure provide a device performing communication and a method for operating the same. According to an embodiment, an operation method comprise receiving, by the AMF, a registration request message from a user equipment (UE) through a base station, the registration request message including network slice selection assistance information (NSSAI) requested from the UE, identifying, by the AMF, whether the requested NSSAI can be serviced, transmitting, by the AMF, a message for requesting a target AMF capable of servicing the requested NSSAI to a network slice manager (NSM) through a network slicing selection function (NSSF) when the requested NSSAI cannot be serviced, and receiving, by the AMF, information regarding the target AMF from the
(Continued)

NSM through the NSSF and transmitting the information regarding the target AMF and NSSAI allowed by the target AMF to the base station.

9 Claims, 15 Drawing Sheets

(56) References Cited

U.S. PATENT DOCUMENTS

| | | | |
|---|---|---|---|
| 2018/0367980 A1* | 12/2018 | Lee | H04L 67/51 |
| 2018/0368061 A1 | 12/2018 | Yu et al. | |
| 2019/0357129 A1 | 11/2019 | Park et al. | |
| 2020/0015158 A1 | 1/2020 | So | |
| 2020/0322778 A1 | 10/2020 | Lee et al. | |

FOREIGN PATENT DOCUMENTS

| | | |
|---|---|---|
| EP | 3522597 A1 | 8/2019 |
| KR | 20170119296 A | 10/2017 |
| KR | 20190118652 A | 10/2019 |
| WO | WO-2018199672 A1 * 11/2018 | ............ H04W 16/02 |
| WO | 2018236819 A1 | 12/2018 |
| WO | 2019074415 A1 | 4/2019 |

OTHER PUBLICATIONS

Huawei, et al., "Ol#4c: TS 23.501: Selection of a Target AMF supporting the Network Slices due to UE mobility", S2-177320, SA WG2 Meeting #123, Ljubljana, Slovenia, Oct. 23-27, 2017, 5 pages.
3GPP TS 23.501 V16.5.1 (Aug. 2020) Technical Specification; 3rd Generation Partnership Project; Technical Specification Group Services and System Aspects; System architecture for the 5G System (5GS); Stage 2 (Release 16), 440 pages.
Rabie, "Core Network Evolution—5G Service based Architecture" Netmanias Tech-Blog, Dec. 11, 2017, 3 pages.
International Search Report and Written Opinion of the International Searching Authority in connection with International Application No. PCT/KR2021/016339 issued Feb. 15, 2022, 11 pages.
Supplementary European Search Report dated May 28, 2024, in connection with European Patent Application No. 21937091.3, 16 pages.

* cited by examiner

DEVICE PERFORMING COMMUNICATION AND METHOD FOR OPERATING THE SAME

CROSS-REFERENCE TO RELATED APPLICATIONS

This application is a bypass continuation of International Patent Application No. PCT/KR2021/016339, filed on Nov. 10, 2021, which is based on and claims the benefit of a Korean patent application number 10-2021-0049111, filed on Apr. 15, 2021, in the Intellectual Property Office, the disclosure of each of which is incorporated by reference herein in its entirety.

BACKGROUND

1. Field

Various embodiments of the disclosure relate to a device performing communication and a method for operating the same.

2. Description of Related Art

The 5G system architecture developed in the 3rd generation partnership project (3GPP) standardization assumes functional slices as components called managed functions (MF). MF refers to a logical application executed in the virtual network function (VNF), the physical network function (PNF), and the cloud-native network function (CNF). MFs may perform a predefined set of functions and communicate with each other via standardized interfaces called reference points.

Network slicing is a technique that allows creating logically separated networks (i.e., slices) using different configurations and quality of service (QoS) requirements on a shared basic infrastructure.

Creating a network slice assumes the generation of new instances of slice-dedicated MFs and reuse of MFs that may be shared between multiple slices. MFs may include dedicated MFs, such as the user plane function (UPF) or the session management function (SMF), and shared MFs, such as the access and mobility management function (AMF), the network slice selection function (NSSF), the unified data management (UDM), and the network repository function (NRF). FIG. 1 illustrates the structure of such a service-based 5G network.

Meanwhile, the management and orchestration (MANO) layer may organize slices, including making decisions about generating new MF instances or reusing existing MF instances.

In a 5G network, a single user equipment (UE) may be connected with a number of different network slices. The user plane may be serviced by slice-dedicated MFs, and the control plane may be anchored to a single AMF which is shared between all slices requested by the UE. In general, the UE may register in an initial AMF and identify the network slice selection assistance information (NSSAI) allowed for the UE. Then, if there is no appropriate AMF supporting preferred single-NSSAIs (S-NSSAIs), the UE may move to a target AMF that may service a combination or a subset of the preferred network slices.

According to a related standard document, a UE may request a combination of up to 8 slices at a given point in time. For example, there may be hundreds of network slices as a result of supporting network slice as a service (NSaaS) use cases. To enable this, an AMF that provides a specific combination of S-NSSAIs should exist in the network.

Also needed is an AMF for serving the combination of S-NSSAIs matching the S-NSSAIs in the requested NSSAI that is approved according to a list of subscribed S-NSSAIs allocated to the UE in UDM and transmitted by the UE according to a registration request from the UE. The NSSF should select an appropriate AMF having a desirable configuration of S-NSSAIs, but the relevant standard document does not specify a method for provisioning an appropriate AMF.

SUMMARY

Various embodiments of the disclosure may provide a device for provisioning an AMF serving a combination of network slices requested by a UE and an operation method thereof.

Objects of various embodiments are not limited to the foregoing, and other unmentioned objects would be apparent to one of ordinary skill in the art from the following description.

According to various embodiments of the disclosure, a method performed by an access and mobility management function (AMF) performing communication may comprise receiving, by the AMF, a registration request message from a user equipment (UE) through a base station, the registration request message including network slice selection assistance information (NSSAI) requested from the UE, identifying, by the AMF, whether the requested NSSAI may be serviced, transmitting, by the AMF, a message for requesting a target AMF capable of servicing the requested NSSAI to a network slice manager (NSM) through a network slicing selection function (NSSF) when the requested NSSAI may not be serviced, and receiving, by the AMF, information regarding the target AMF from the NSM through the NSSF and transmitting the information regarding the target AMF and NSSAI allowed by the target AMF to the base station.

According to various embodiments of the disclosure, a method performed by a network slicing selection function (NSSF) performing communication may comprise receiving, by the NSSF, network slice selection assistance information (NSSAI) requested from a UE, from an access and mobility management function (AMF), identifying, by the NSSF, a target AMF capable of servicing the requested NSSAI, requesting, by the NSSF, a network slice manager (NSM) to provision the target AMF when the target AMF capable of servicing the requested NSSAI is not identified and receiving information regarding the target AMF, and transmitting, by the NSSF, the information regarding the target AMF and NSSAI allowed by the target AMF to a base station through the AMF.

According to various embodiments of the disclosure, a device of a network slicing selection function (NSSF) performing communication may comprise a transceiver, and at least one processor controlling an operation of the transceiver. The at least one processor may be configured to receive network slice selection assistance information (NSSAI) requested from a UE, from an access and mobility management function (AMF), identify a target AMF capable of servicing the requested NSSAI, request a network slice manager (NSM) to provision the target AMF when the target AMF capable of servicing the requested NSSAI is not identified and receive information regarding the target AMF, and control the transceiver to transmit the information regarding the target AMF and NSSAI allowed by the target AMF to a base station through the AMF.

A network entity device performing communication and an operation method thereof according to various embodiments of the disclosure enable automatic on-demand AMF allocation according to current needs in a network. Further, the network entity device and the operation method thereof according to various embodiments of the disclosure may efficiently use existing AMFs and efficiently use resources by allocating new AMF instances only when necessary.

Further, the network entity device and the operation method thereof according to various embodiments of the disclosure do not need to automatically plan and deploy AMFs and may automatically manage the life cycle of AMF instances.

Further, the network entity device and the operation method thereof according to various embodiments of the disclosure may support network slice as a service (NSaaS) use cases in which a large amount of network slices are generated by the user.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the disclosure may provide a method for provisioning an AMF serving a combination of network slices requested by a UE and a device for the same. In the disclosure, it is assumed that an AMF provisioning procedure is invoked when a combination of preferred S-NSSAIs (i.e., S-NSSAIs included in the NSSAI requested by the UE that are also among the UE's subscribed S-NSSAIs) is not serviced by an AMF instance present in the network. Further, the disclosure uses the terms AMF, NSSF, and NSM to denote network entities, but other network entities that control and manage access and mobility of the UE may perform the same functions as the AMF of the disclosure. Similarly, other network entities that control and manage network slices may perform the same functions as the NSM of the disclosure. Further, other network entities that control selection of network slices may perform the same functions as the NSSF of the disclosure.

In the disclosure, the AMF provisioning procedure is described in terms of two separate modes: a direct mode and a deferred mode.

The direct mode may provision a target AMF with a synchronous blocking scheme during a UE registration procedure. Accordingly, the UE may be anchored to the target AMF serving the preferred S-NSSAI combination of the UE at the end of the UE registration procedure.

In the deferred mode, during the initial registration procedure of the UE, target AMF provisioning may be requested, and the target AMF may be provisioned in an asynchronous non-blocking scheme. Accordingly, the UE may be anchored to a temporary AMF at the end of the UE registration procedure, and the target AMF may be selected by the NSSF to service the NSSAI requested from the UE (where an NSSAI is a set of S-NSSAIs). If the selected target AMF is available, the AMF may be reallocated to the UE according to the UE configuration update procedure, and the UE may be anchored to the target AMF serving the desired combination of S-NSSAIs.

Figure 1:
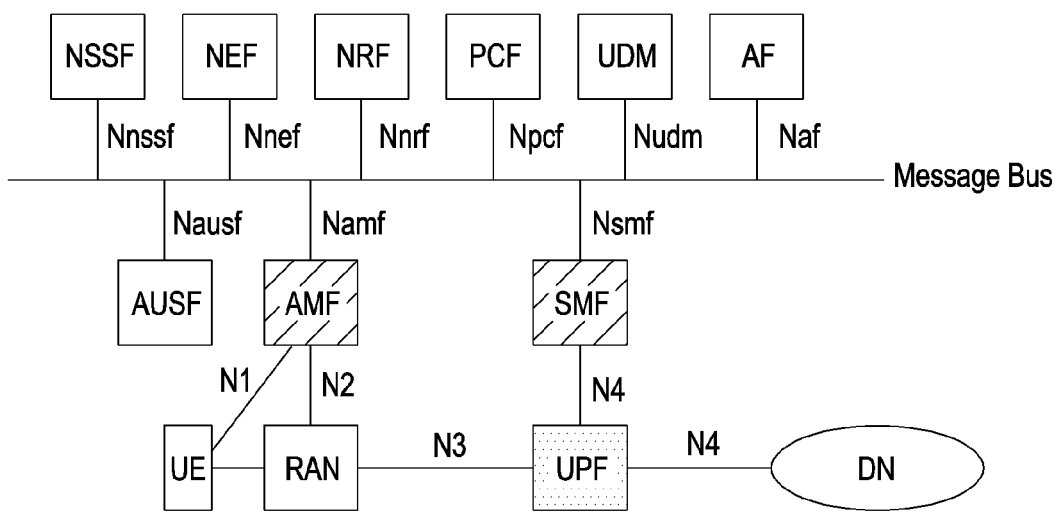
FIG. 1 is a diagram illustrating a structure of a service-based 5G network.
Figure 2:
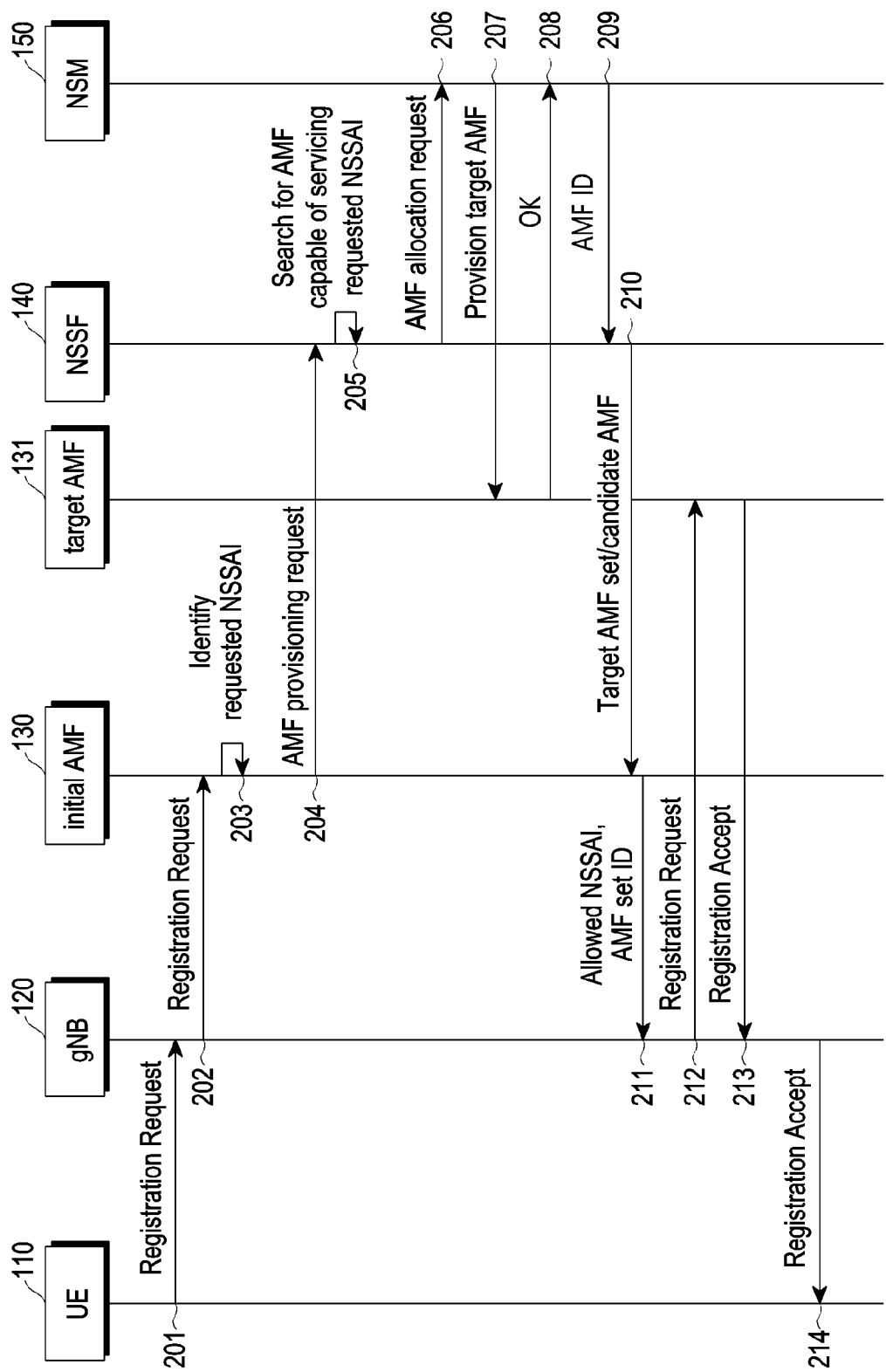
FIG. 2 is a signal diagram illustrating a process of provisioning an AMF in a direct mode according to various embodiments.

FIG. 2 is a signal diagram illustrating a process of provisioning an AMF in a direct mode according to various embodiments.

Referring to FIG. 2, in operation 201, a 5G base station (gNB) 120 may receive a registration request from a UE 110 and, in operation 202, transfer the received registration request to the initial AMF 130. The registration request received from the UE may include an NSSAI requested by the UE.

In operation 203, the initial AMF 130 receiving the registration request from the gNB 120 may identify the requested NSSAI and may determine whether the initial AMF 130 may service the requested NSSAI. If it is determined that the initial AMF 130 cannot service the requested NSSAI, in operation 204, the initial AMF 130 may send a request for provisioning of an AMF that can service the requested NSSAI to the NSSF 140. The AMF provisioning request may include information such as the requested NSSAI, subscribed S-NSSAIs of the UE, a home public land mobile network (HPLMN) identity (ID) of the UE, and a tracking area (TA).

In operation 205, the NSSF 140 receiving the AMF provisioning request may search for an AMF capable of servicing the requested NSSAI and, if no AMF capable of servicing the requested NSSAI is discovered, may send a request for AMF allocation to the network slice manager (NSM) 150 in operation 206. The AMF allocation request may include information such as the requested NSSAI and subscribed S-NSSAIs.

In operation 207, the NSM 150 receiving the AMF allocation request may provision a target AMF 131 capable of servicing the requested NSSAI and may inform the target AMF 131 of the selection result.

According to an embodiment, a number of methods may exist for the NSM 150 to provision the target AMF 131 in operation 207. For example, the NSM 150 may use at least one of the following methods to select the target AMF 131: instantiating a new AMF, reconfiguring an existing AMF, or using a pre-instantiated AMF pool. These methods will be discussed in further detail below.

In operation 208, the NSM 150 may receive a confirm (OK) message from the target AMF 131 and, in operation 209, may send the ID of the target AMF 131 to the NSSF 140.

In operation 210, the NSSF 140 may transmit a set of target AMFs or a candidate AMF to the initial AMF 130 based on the target AMF ID.

In operation 211, the initial AMF 130 may transmit an allowed NSSAI and an AMF set ID to the gNB 120 based on the target AMF set or the candidate AMF and, in operation 212, the gNB 120 may send a registration request including the requested NSSAI to the target AMF 131.

In operation 213, the gNB 120 may receive a registration accept from the target AMF 131, and the gNB 120 may send a registration accept to UE 110 in operation 214.

Figure 3:
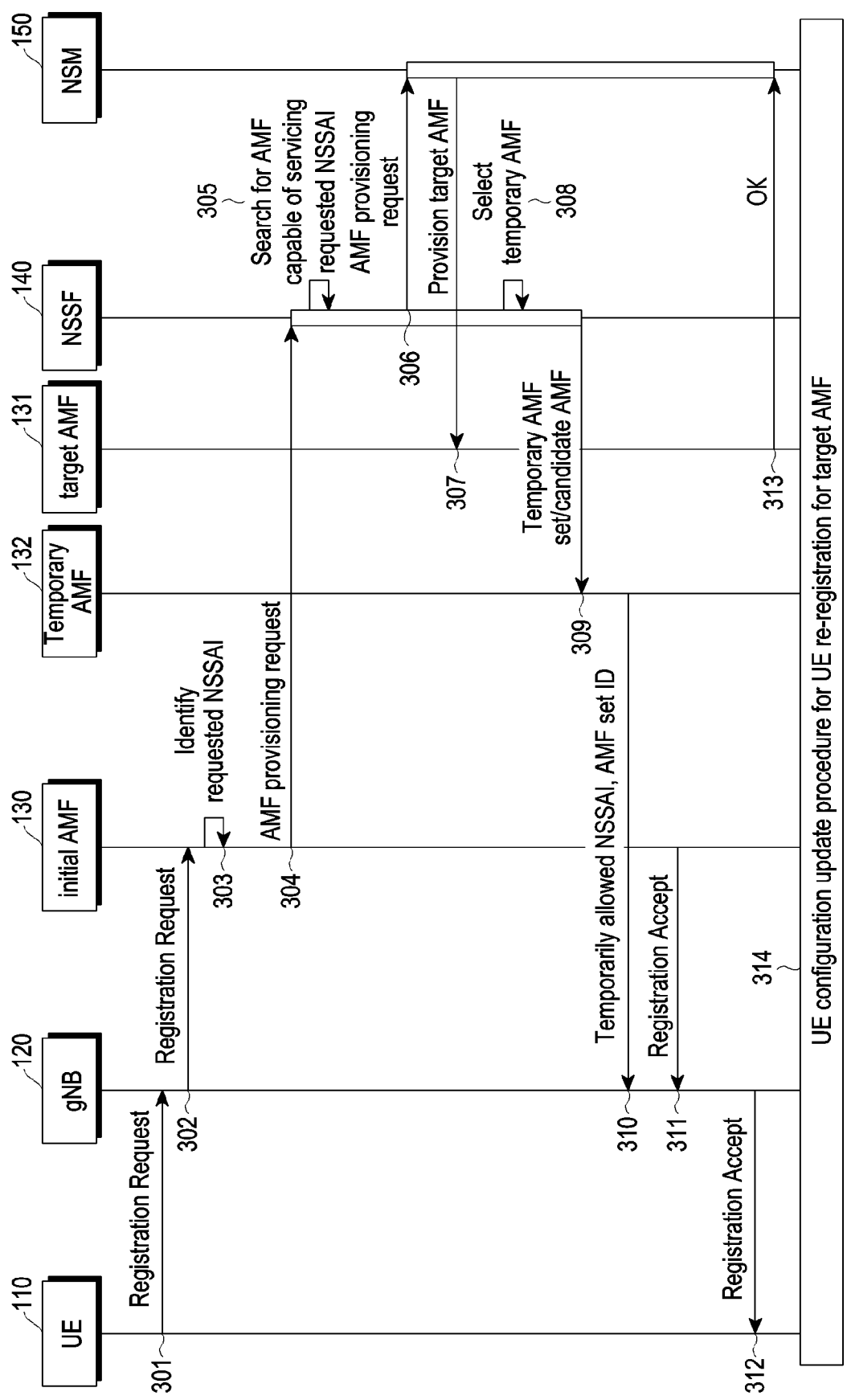
FIG. 3 is a signal diagram illustrating a process of provisioning an AMF in a deferred mode according to various embodiments.

FIG. 3 is a signal diagram illustrating a process of provisioning an AMF in a deferred mode according to various embodiments.

Referring to FIG. 3, in operation 301, a gNB 120 may receive a registration request from a UE 110 and, in operation 302, transfer the received registration request to the initial AMF 130. The registration request may include an NSSAI requested by the UE.

In operation 303, the initial AMF 130 receiving the registration request may identify the requested NSSAI and may determine whether the initial AMF 130 may service the requested NSSAI. If it is determined that the initial AMF 130 cannot service the requested NSSAI, in operation 304, the initial AMF 130 may send a request for provisioning of an AMF that can service the requested NSSAI to the NSSF 140. The AMF provisioning request may include information such as the requested NSSAI, subscribed S-SNSSAIs of the UE, an HPLMN ID of the UE, and a tracking area (TA).

In operation 305, the NSSF 140 receiving the AMF provisioning request may search for an AMF capable of servicing the requested NSSAI and, if no AMF capable of servicing the requested NSSAI is discovered, may send a request for AMF provisioning to the NSM 150 in operation 306. The AMF provisioning request may include the requested NSSAI, subscribed S-SNSSAIs, and source AMF information.

In operation 307, the NSM 150 receiving the AMF provisioning request may provision a target AMF 131 capable of servicing the requested NSSAI and may inform the target AMF 131 of the selection result.

According to an embodiment, a number of methods may exist for the NSM 150 to provision the target AMF 131 in operation 307. For example, the NSM 150 may use any one of the following methods to select the target AMF 131: instantiating a new AMF, reconfiguring an existing AMF, or using a pre-instantiated AMF pool. These methods will be discussed in further detail below.

In operation 308, the NSSF 140 may select a temporary AMF 132 that supports a limited set of the allowed NSSAI and, in operation 309, may transmit the temporary AMF set or candidate AMF to the selected temporary AMF 132. According to an embodiment, the temporary AMF 132 may be the initial AMF 130.

In operation 310, the temporary AMF 132 may transmit the temporarily allowed NSSAI (e.g., the limited set of the allowed NSSAI that the temporary AMF 132 supports) and AMF set ID to the gNB 120.

In operation 311, the gNB 120 may receive a registration accept from the target AMF 131, and the gNB 120 may send a registration accept to UE 110 in operation 312.

In operation 313, the target AMF 131 may transmit a confirm (OK) message to the NSM 150 in response to the selection of the target AMF 131 by the NSM 150 at step 307.

In operation 314, it may be advertised that the target AMF 131 is available, and a UE configuration update procedure for UE re-registration to the target AMF 131 is triggered.

Figure 4:
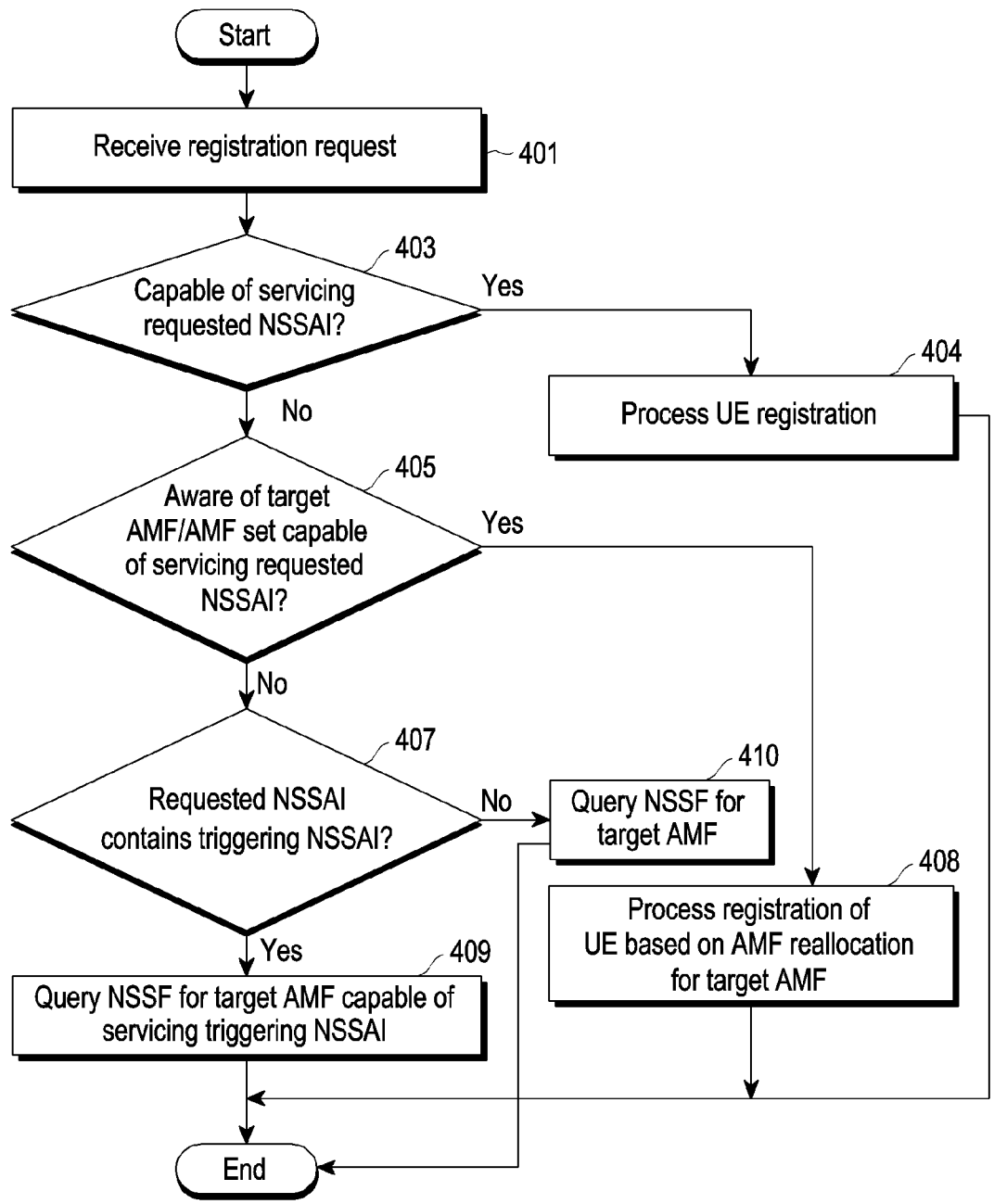
FIG. 4 is a flowchart illustrating a method for an initial AMF 130 to process a registration request of a UE according to various embodiments.

FIG. 4 is a flowchart illustrating a method for an initial AMF 130 to process a registration request of a UE according to various embodiments.

Referring to FIG. 4, the initial AMF 130 may receive a registration request including a requested NSSAI from the UE 110 in operation 401, and may identify whether the initial AMF 130 may service the requested NSSAI in operation 403.

When it is determined that the initial AMF 130 may service the requested NSSAI, the initial AMF 130 may process registration of the UE according to a common procedure in operation 404.

When it is determined that the initial AMF 130 cannot service the requested NSSAI, the initial AMF 130 may attempt to identify a target AMF or AMF set capable of servicing the requested NSSAI in operation 405.

If the initial AMF 130 can identify a target AMF or AMF set that is capable of servicing the requested NSSAI (e.g., if the initial AMF 130 is aware of a target AMF or AMF set that can service the exact set of requested NSSAI), the initial AMF 130 may process registration of the UE based on the AMF reallocation to the target AMF or AMF set in operation 408.

When the initial AMF 130 is unable to identify a target AMF or AMF set that is capable of servicing the requested NSSAI, the initial AMF 130 in operation 407 may identify whether the requested NSSAI contains a subset of subscribed S-NSSAIs of the UE (e.g., S-NSSAIs where the UE has valid registrations) for which the initial AMF 130 is not currently aware of any AMF in the network capable of servicing the subset. Such a subset of S-NSSAIs of the requested NSSAI may be referred to as a "triggering NSSAI." If it is determined that the requested NSSAI includes a triggering NSSAI, the initial AMF 130 may in operation 409 transmit a message (e.g., Nnssf_NS_Selection_Get) to the NSSF 140 for target AMF selection with the triggering NSSAI. That is, the AMF 130 may ask the NSSF 140 to select a target AMF 131 that supports the triggering NSSAI rather than the requested NSSAI.

If it is determined that of the requested NSSAI does not include triggering NSSAI, the initial AMF 130 may at operation 410 transmit a message (e.g., Nnssf_NS_Selection_Get) to the NSSF 140 for target AMF selection according to a common procedure (e.g., with the requested NSSAI).

The triggering NSSAI is an attribute for informing the AMF of the combination of S-NSSAIs that should be queried to the NSSF 140 for AMF selection and may be represented as, e.g., all S-NSSAIs or a list of S-NSSAIs.

Figure 5A:
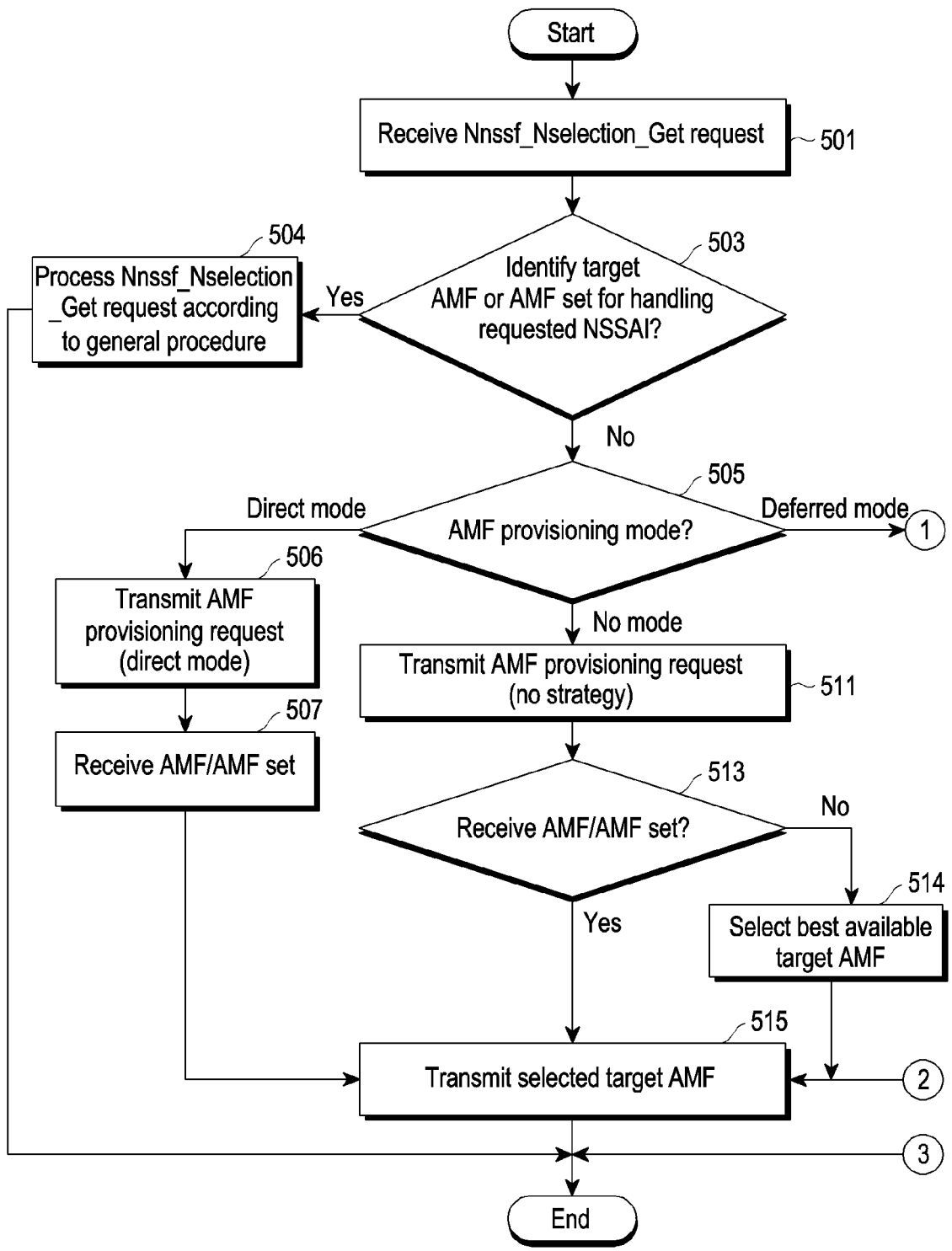
FIGS. 5A and 5B are flowcharts illustrating operations of an NSSF 140 according to various embodiments.
Figure 5B:
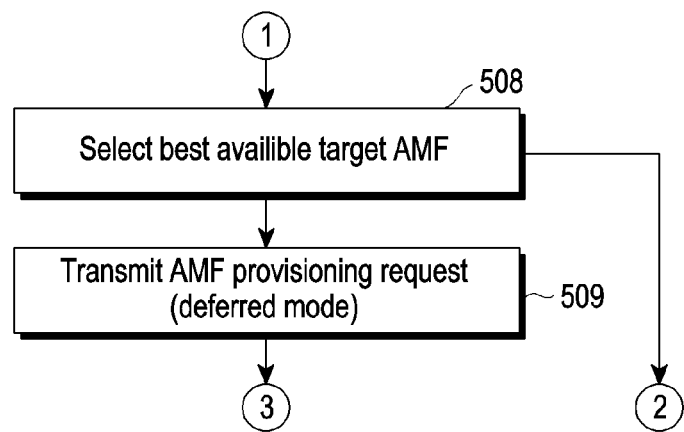

FIGS. 5A and 5B are flowcharts illustrating operations of an NSSF 140 according to various embodiments.

Referring to FIGS. 5A and 5B, in operation 501, the NSSF 140 receives the Nnssf_Nselection_Get request from the initial AMF 130 to query for the AMF list (e.g., from an NRF) and, in operation 503, may attempt to identify the target AMF or AMF set for handling the requested NSSAI (e.g., from the AMF list).

If the target AMF or AMF set for handling the requested NSSAI is identified, the NSSF 140 may process the Nnssf_Nselection_Get request according to a common procedure in operation 504.

If the target AMF or AMF set for handling the requested NSSAI is not identified, the NSSF 140 may identify a mode for provisioning the target AMF (e.g., target AMF 131) to service the requested NSSAI in operation 505. According to an embodiment, the mode for provisioning the target AMF may be one of a direct mode or a deferred mode, or may not be set to either the direct mode or the deferred mode.

In the case of the direct mode, in operation 506, the NSSF 140 may transmit a direct mode AMF provisioning request to the NSM 150 and, in operation 507, may receive the AMF or AMF set identifier from the NSM 150. In an embodiment, the AMF or AMF set identifier may be an ID of the AMF or AMF set that is provisioned to service the requested NSSAI, or an IP address list of the AMF or AMF set that is provisioned to service the requested NSSAI. In operation 515, the NSSF 150 may transmit the AMF or AMF set identifier received from the NSM 150 to the initial AMF 130.

In the case of the deferred mode, in operation 508, the NSSF 140 may search for the best available target AMF or AMF set among the AMFs that do not fully cover the requested NSSAI. According to an embodiment, the NSSF 140 may search for a target AMF that is capable of serving the triggered NSSAI (the combination of S-NSSAIs that is the intersection of the requested NSSAI and the S-NSSAIs to which the UE is subscribed). When the best available target AMF is selected, the NSSF 140 may transmit the selected target AMF or AMF set identifier to the initial AMF 130 in operation 515. Additionally, the NSSF 140 may transmit a deferred mode AMF provisioning request to the NSM 150 in operation 509. The deferred mode AMF provisioning request in operation 509 may be transmitted immediately after or simultaneously with transmitting the selected best available target AMF or AMF set identifier to the initial AMF 130 in operation 515.

When operated in neither the direct mode nor the deferred mode, that is, when there is no mode, the NSSF 140 may transmit an AMF provisioning request to the NSM 150 with no specified provisioning strategy in operation 511 and, in operation 513, the NSSF 140 may identify whether an AMF or AMF set identifier is received from the NSM 150 in response to the request. When the AMF or AMF set identifier is received (e.g., indicating that the NSM 150 has provisioned a target AMF or AMF set in direct mode), the NSSF 150 may transmit the selected target AMF or AMF set identifier to the initial AMF 130 in operation 515. If the AMF or AMF set identifier is not received (e.g., if the NSM 150 returns only an acceptance of the request, indicating that it is provisioning a target AMF or AMF set in deferred mode), the NSSF 140 may select a best available target AMF or AMF set in operation 514 and, in operation 515, may transmit the selected target AMF or AMF set identifier to the initial AMF 130.

Figure 6:
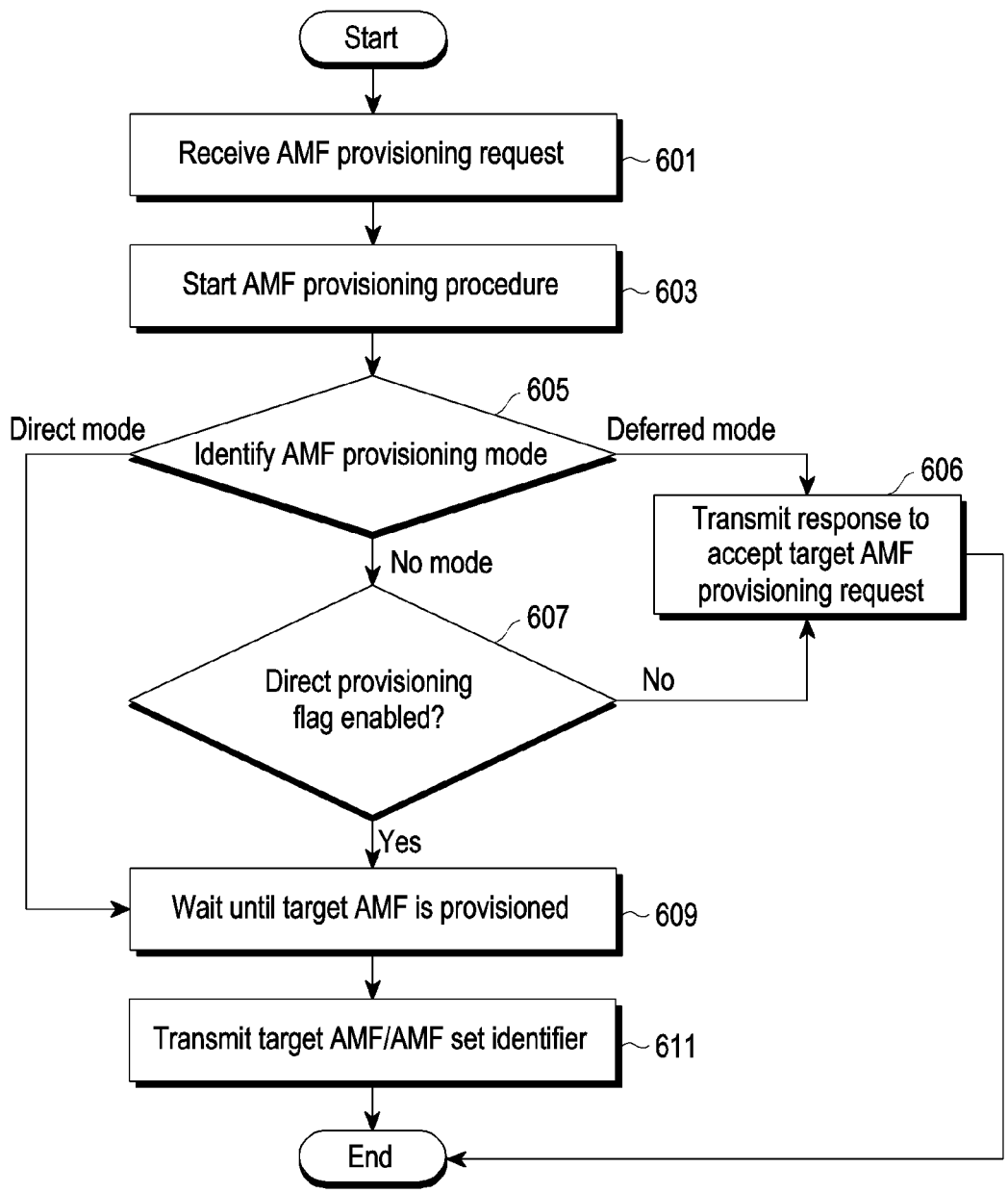
FIG. 6 is a flowchart illustrating operations of an NSM 150 according to various embodiments.

FIG. 6 is a flowchart illustrating operations of an NSM 150 according to various embodiments.

Referring to FIG. 6, in operation 601, the NSM 150 may receive an AMF provisioning request from the NSSF 140 and may trigger the AMF provisioning procedure in operation 603. The AMF provisioning request may include information about the AMF provisioning mode (i.e., direct mode, deferred mode, no mode) and the requested NSSAI.

In operation 605, the NSM 150 may identify the AMF provisioning mode based on the AMF provisioning request.

If the AMF provisioning mode is the direct mode, the NSM 150 may wait until the target AMF is provisioned in operation 609 and, when the target AMF is provisioned, may transmit the target AMF or AMF set identifier to the NSSF 140 in operation 611. According to an embodiment, the target AMF or AMF set identifier may be an ID of the AMF or AMF set or an IP address list of the AMF or AMF set.

When the AMF provisioning mode is the deferred mode, in operation 606, the NSM 150 may transmit a response indicating that the target AMF provisioning request is accepted to the NSSF 140.

When the AMF provisioning mode is not the direct mode or the deferred mode (i.e., when there is no mode or no provisioning strategy indicated), the NSM 150 may identify whether a direct provisioning flag is enabled in operation 607 and, if enabled, the NSM 150 may, in operation 609, wait until the target AMF is provisioned and, when the target AMF is provisioned, may transmit the target AMF or AMF set identifier to the NSSF 140 in operation 611. According to an embodiment, the target AMF or AMF set identifier may be an ID of the AMF or AMF set or an IP address list of the AMF or AMF set. When the direct provisioning flag is disabled, in operation 606, the NSM 150 may transmit a response indicating that the target AMF provisioning request is accepted to the NSSF 140.

Figure 7:
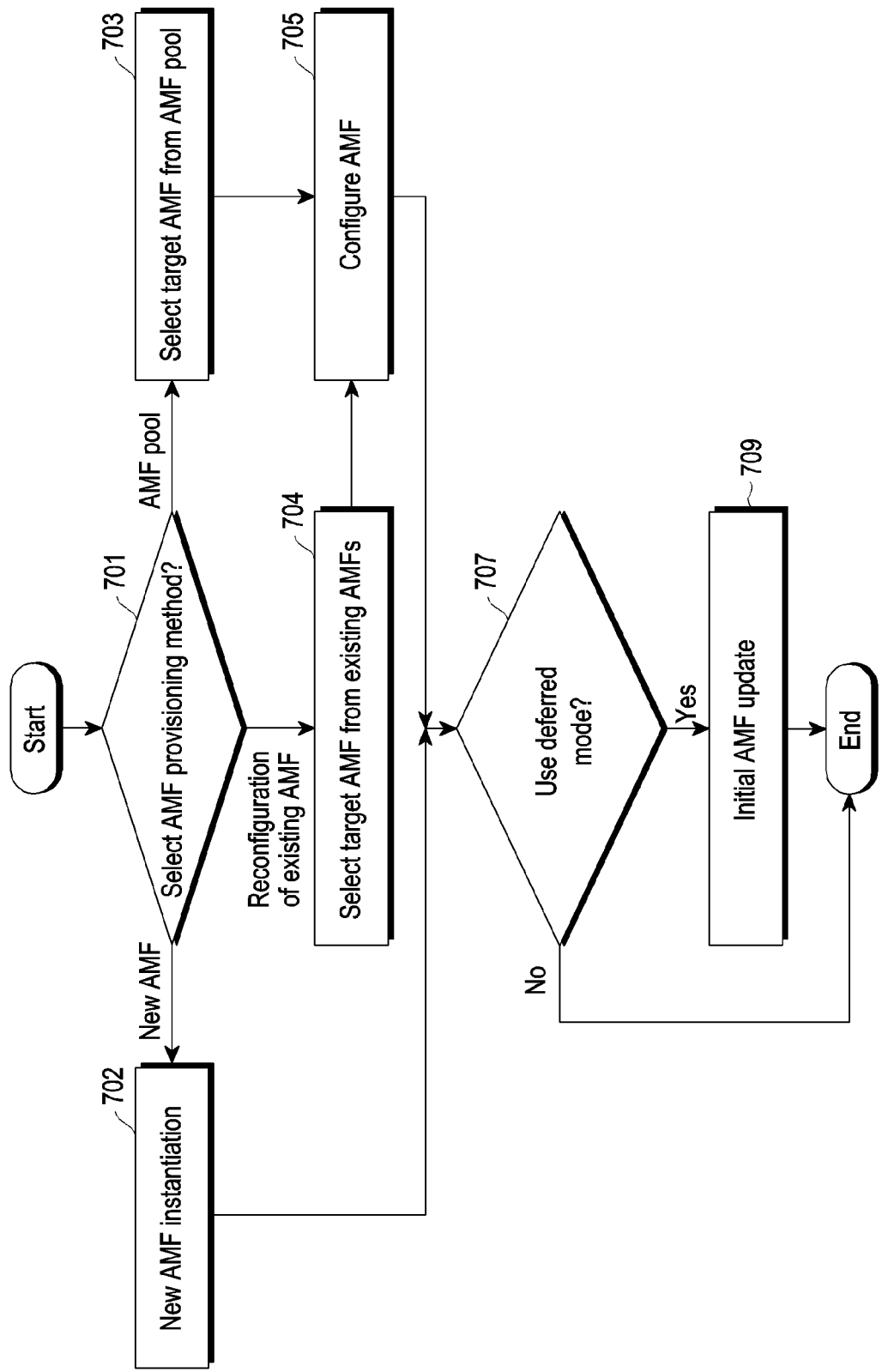
FIG. 7 is a flowchart illustrating operations of an NSM 150 according to various embodiments.

FIG. 7 is a flowchart illustrating operations of an NSM 150 according to various embodiments.

Referring to FIG. 7, in operation 701, the NSM 150 may select an AMF provisioning method. The AMF provisioning method may be one of instantiation of a new AMF, reconfiguration of an existing AMF, or using a pre-instantiated AMF pool. The AMF provisioning method may be selected based on an AMF provisioning policy, e.g., a configuration parameter of the NSM 150.

When instantiation of a new AMF is selected as the AMF provisioning method, in operation 702, the NSM 150 may instantiate a new AMF and then perform operation 707.

When a pre-instantiated AMF pool is selected as the AMF provisioning method, in operation 703, the NSM 150 may select a target AMF from the pre-instantiated AMF pool, configure the AMF supporting the requested NSSAI in operation 705, and may then perform operation 707.

According to an embodiment, as criteria for selecting a target AMF from the pre-instantiated AMF pool, at least one of non-functional characteristics, such as the proximity, in terms of geographic location or experienced latency, of the AMF to the UE, or maximum capability of the pre-instantiated AMF for the UE, or other factors may be considered.

When reconfiguration of an existing AMF is selected as the AMF provisioning method, in operation 704, the NSM 150 may select a target AMF from existing AMFs, configure the AMF supporting the requested NSSAI in operation 705, and then perform operation 707.

According to an embodiment, as criteria for selecting a target AMF to be reconfigured from existing AMFs, at least one of the current load of AMF instances, the quantity of S-NSSAIs serviced by a given AMF, the proximity, in terms of geographic location or experienced latency, of the AMF to the UE, the AMF already covering the largest subset of S-NSSAIs included in the requested NSSAI, and other factors may be considered.

According to an embodiment, the target AMF selected by the NSM 150 may be the same as the initial AMF.

In operation 707, the NSM 150 may identify whether the deferred mode or an existing AMF reconfiguration method is used for AMF provisioning and, if it is identified that the deferred mode is used for AMF provisioning, may update the initial AMF 130 with the provisioned target AMF in operation 709.

Figure 8:
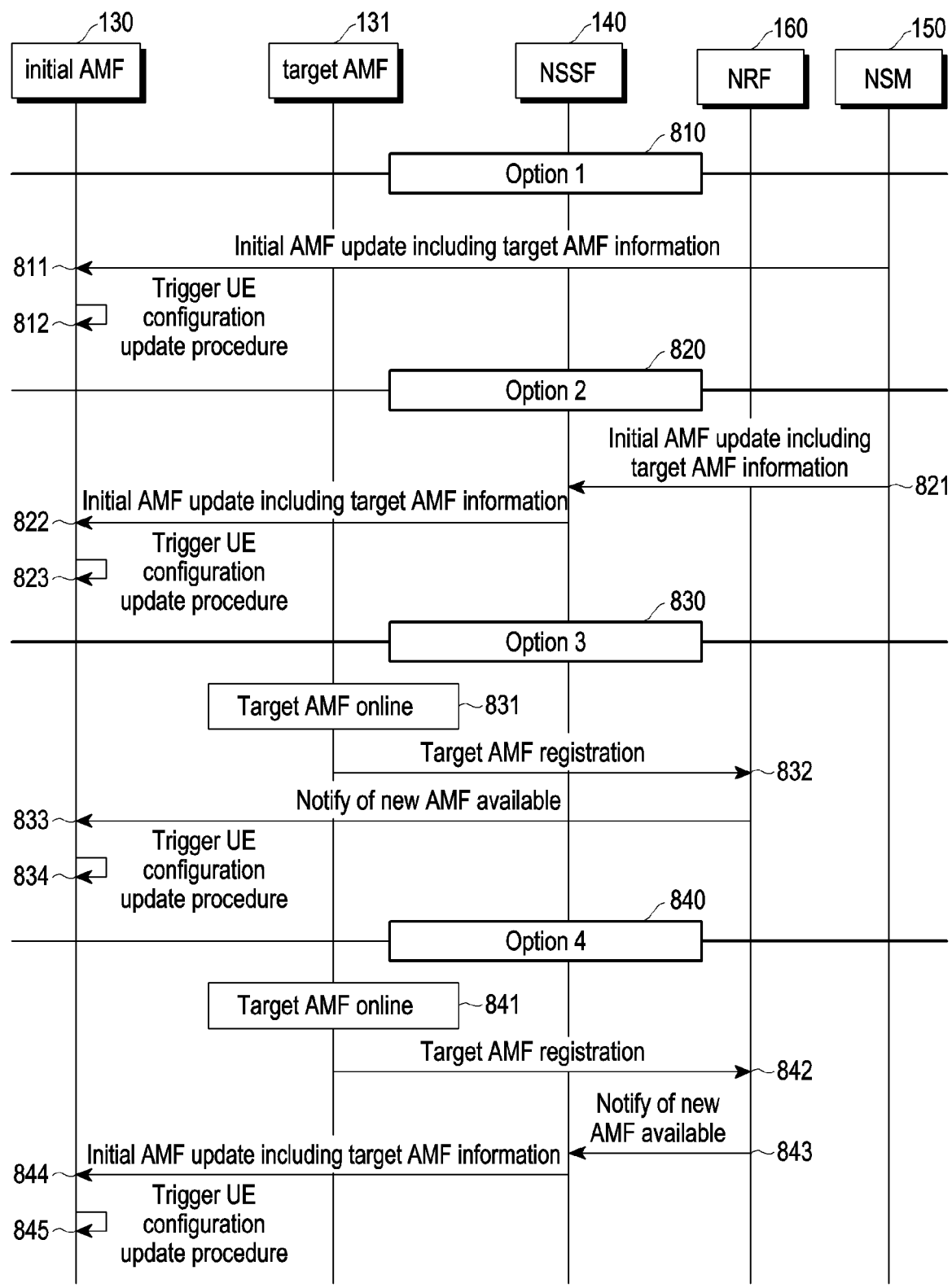
FIG. 8 is a signal diagram illustrating a method for performing an initial AMF 130 update according to various embodiments.

FIG. 8 is a signal diagram illustrating methods for performing an initial AMF 130 update according to various embodiments.

Referring to FIG. 8, the initial AMF 130 may be updated with the provisioned target AMF by any one of the four options 1 to 4 (810 to 840).

According to the method for updating the initial AMF 130 with the provisioned target AMF based on option 1 810, in operation 811, the NSM 150 may transmit an initial AMF update including target AMF information to the initial AMF 130, and the initial AMF 130 may trigger a UE configuration update procedure in operation 812.

According to the method for updating the initial AMF 130 with the provisioned target AMF based on option 2 820, in operation 821, the NSM 150 may transmit an initial AMF update including target AMF information to the NSSF 140 and, in operation 822, the NSFF 140 may transmit an initial AMF update including the target AMF information to the initial AMF 130 and, in operation 823, the initial AMF 130 may trigger the UE configuration update procedure.

According to the method for updating the initial AMF 130 with the provisioned target AMF based on option 3 830, if the target AMF 131 is online in operation 831, the target AMF 131 may register into the NRF 160 in operation 832, and if the NRF 160 notifies the initial AMF 130 that a new AMF (i.e., target AMF) is available in operation 833, the initial AMF 130 may trigger a UE configuration update procedure in operation 834.

According to the method for updating the initial AMF 130 with the provisioned target AMF based on option 4 830, if the target AMF 131 is online in operation 841, the target AMF 131 may register into the NRF 160 in operation 842 and, if the NRF 160 notifies the NSSF 140 that a new AMF (i.e., target AMF) is available in operation 843, the NSFF 140 may transmit information about the target AMF 131 to the initial AMF 130 in operation 844 and, in operation 845, the initial AMF 130 may trigger the UE configuration update procedure.

According to an embodiment, the information regarding the target AMF may include at least one of an AMF ID, an AMF IP address, an AMF set, a list of serviced NSSAI or S-NSSAI, and a flag informing the initial AMF that a new AMF has been created.

Figure 9:
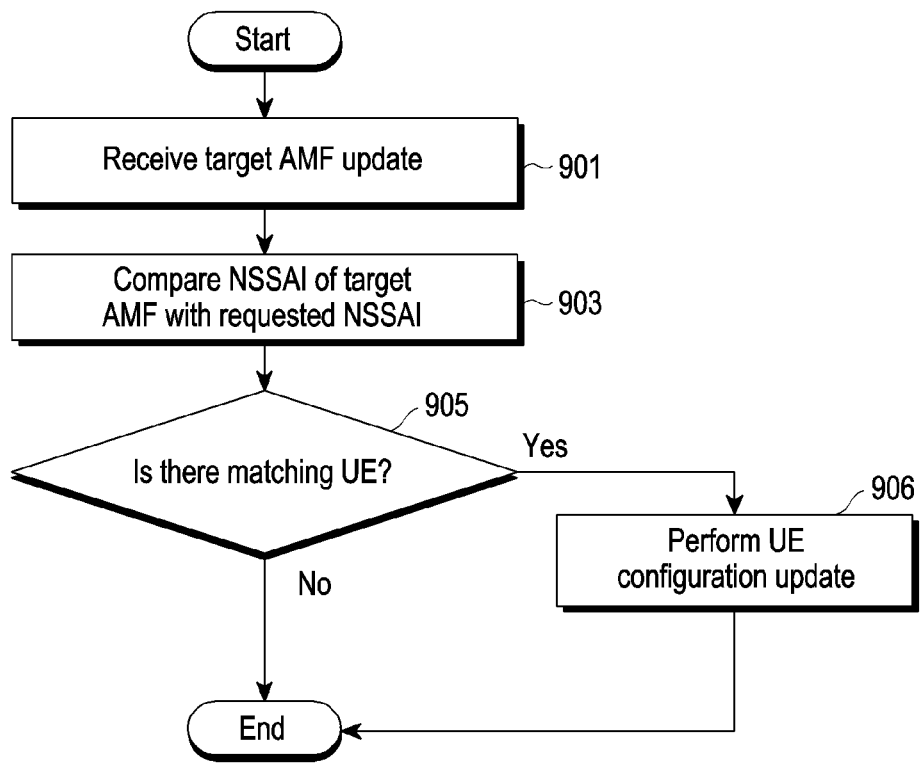
FIG. 9 is a flow chart illustrating a UE configuration update method for an initial AMF 130 according to various embodiments.

FIG. 9 is a flow chart illustrating a UE configuration update procedure for an initial AMF 130 according to various embodiments. For example, the UE configuration update procedure of FIG. 9 could be used in operations 812, 823, 834, and 845 of FIG. 8.

Referring to FIG. 9, in operation 901, the initial AMF 130 may receive a target AMF update from the NSM 150 or the NSSF 140 or may be notified that a new AMF (i.e., target AMF) is available to the NRF 160.

In operation 903, the initial AMF 130 may compare the S-NSSAI list supported by the new AMF (i.e., the target AMF) with the requested NSSAI of the registered UE and may identify whether there are matching UEs in operation 905.

According to an embodiment, the matching criterion may be any one of the following.

1. Full match: The initial AMF 130 may identify the NSSAI of the new AMF (i.e., the target AMF) and may compare the NSSAI of the new AMF (i.e., the target AMF) with the NSSAI requested by the registered UEs, and then trigger a relocation procedure for fully matched NSSAI.

2. Exact match: The initial AMF 130 may compare the NSSAI of the new AMF (i.e., the target AMF) with the NSSAI requested by the registered UEs and then trigger a relocation procedure for exactly matched NSSAI.

3. Best match: The initial AMF 130 may compare the NSSAI of the new AMF (i.e., the target AMF) with the NSSAI requested by the registered UEs and may then trigger a relocation procedure for UEs where the target AMF 131 has more matching S-NSSAIs than the initial AMF 130.

4. Selected S-NSSAIs: The initial AMF 130 may compare the NSSAI of the new AMF (i.e., the target AMF) with the NSSAI requested by the registered UEs and may then trigger a relocation procedure for UEs where both the UE and the target AMF have some matching S-NSSAIs selected from a designated S-NSSAI list.

The initial AMF 130 may identify a matched UE based on at least one of the above-described methods and then perform a UE configuration update based on the AMF reallocation in operation 906 to update the allowed NSSAI for the matched UEs.

Figure 10:
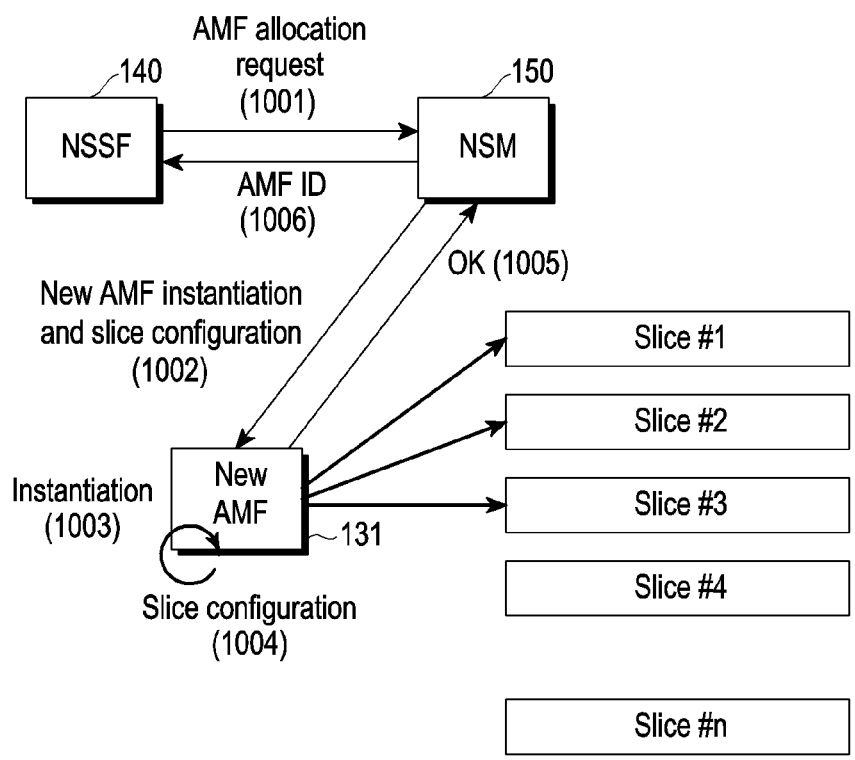
FIG. 10 is a diagram illustrating a method for an NSM 150 to provision an AMF based on new AMF instantiation according to various embodiments.

FIG. 10 is a diagram illustrating a method for an NSM 150 to provision an AMF based on new AMF instantiation according to various embodiments.

Referring to FIG. 10, in operation 1001, the NSM 150 may receive the AMF allocation (or provisioning) request for the requested NSSAI (e.g., slices #1, #2, #3) from the NSSF 140 and, in operation 1002, may instantiate a new AMF (i.e., target AMF 131) and may configure the new AMF 131 to service slices #1, #2, and #3.

In operation 1003, the new AMF 131 may be instantiated, and the new AMF 131 may be configured to service slices #1, #2, and #3 in operation 1004. In operation 1005, then, the new target AMF 131 may transmit a confirm (OK) message to the NSM 150.

Upon receiving the OK message from the new target AMF 131, the NSM 150 may transmit the ID of the new target AMF 131 to the NSSF 140 in operation 1006.

Figure 11:
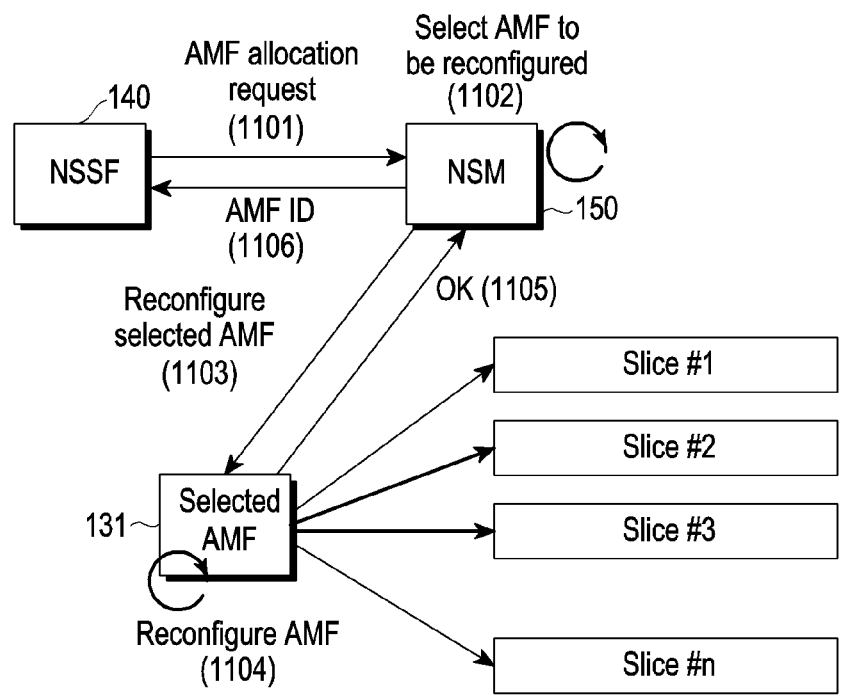
FIG. 11 is a diagram illustrating a method for an NSM 150 to provision an AMF based on an existing AMF reconfiguration according to various embodiments.

FIG. 11 is a diagram illustrating a method for an NSM 150 to provision an AMF based on reconfiguration of an existing AMF according to various embodiments.

Referring to FIG. 11, in operation 1101, the NSM 150 may receive the AMF allocation (or provisioning) request for the requested NSSAI (e.g., slices #1, #2, #3) from the NSSF 140 and, in operation 1102, may select an AMF (i.e., target AMF 131) to be reconfigured from among existing AMFs and may reconfigure the new AMF 131 to service slices #1, #2, and #3. According to an embodiment, slices configured to be serviced by the selected AMF 131 may be excluded during the reconfiguration operation.

After the selected AMF 131 is reconfigured to service slices #1, #2, and #3 in operation 1104, a confirm (OK) message may be transmitted to the NSM 150 in operation 1105. FIG. 11 illustrates an embodiment in which the selected AMF 131 has been already configured to service slice #1, and slice #2 and slice #3 are reconfigured.

Upon receiving the OK message from the selected AMF 131, the NSM 150 may transmit the ID of the new AMF to the NSSF 140 in operation 1106.

In the method for provisioning an AMF based on reconfiguring an existing AMF, the reconfiguration of an existing AMF may be changed to receive S-NSSAIs included in the requested NSSAI combination. According to an embodiment, the selected AMF 131 may allow for dynamic runtime reconfiguration. According to this method, AMF reconfiguration may be performed relatively quickly, and it is possible to minimize an influence on the time required for the UE registration procedure. This method may be more suitable for the direct mode among the AMF provisioning modes according to the disclosure.

Upon selecting an AMF to be reconfigured from among existing AMFs, at least one of the current load of AMF instances, the quantity of S-NSSAIs serviced by the AMF, the proximity of the AMF to the UE, in terms of geographic location or experienced latency of the AMF, the AMF capable of covering the largest subset of S-NSSAIs included in the requested NSSAI, and other factors may be considered.

Figure 12:
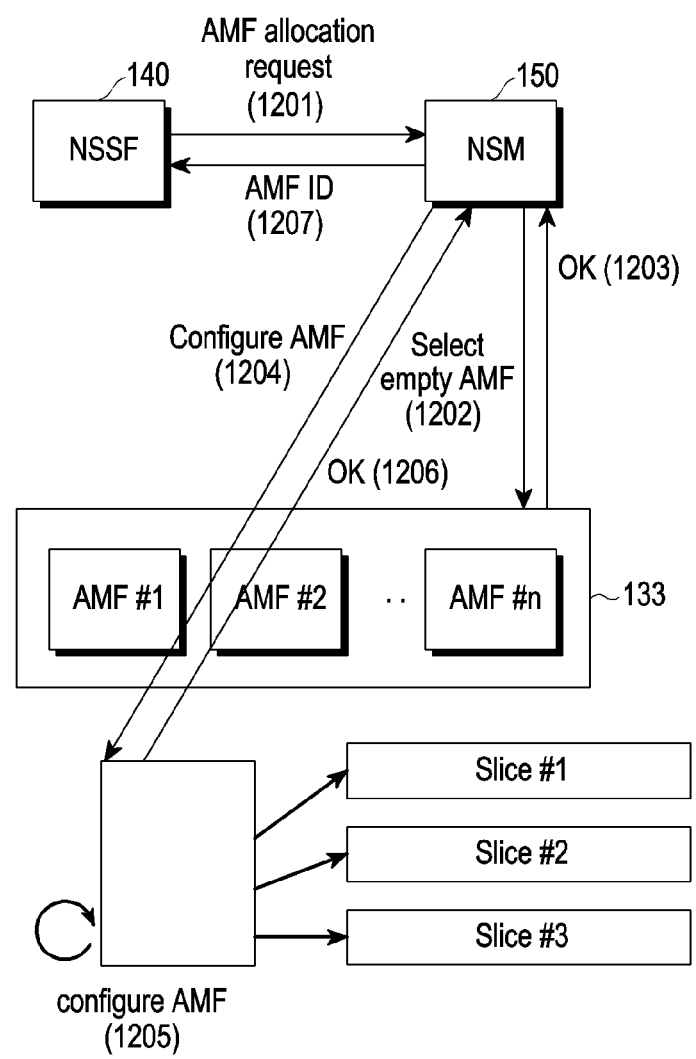
FIG. 12 is a diagram illustrating a method for an NSM 150 to provision an AMF based on an AMF pool instantiated in advance according to various embodiments.

FIG. 12 is a diagram illustrating a method for an NSM 150 to provision an AMF based on an AMF pool instantiated in advance according to various embodiments.

According to an embodiment, a pool containing a specified amount of AMFs may be pre-instantiated. The AMFs included in the pool do not have a specific configuration and may not be servicing any UE.

Referring to FIG. 12, in operation 1201, the NSM 150 may receive the AMF allocation (or provisioning) request for the requested NSSAI (e.g., slices #1, #2, #3) from the NSSF 140 and, in operation 1202, may select empty AMFs 133 from the pre-instantiated AMF pool.

In operation 1203, the NSM 150 may receive a confirm (OK) message from at least one of the selected AMFs 133 and, in operation 1204, at least one among the selected AMFs having transmitted the OK message may be configured to support S-NSSAIs included in the requested NSSAI.

In operation 1205, at least one selected AMF 133 may be configured to service slices #1, #2, and #3 and, in operation 1206, a confirm (OK) message may be transmitted to the NSM 150.

Upon receiving the OK message from the at least one selected AMF 133, the NSM 150 may transmit the ID of the new AMF to the NSSF 140 in operation 1207.

According to the method illustrated in FIG. 12, after UE initial registration, the NSM 150 may determine that the AMF selected from the AMF pool is suboptimal based on the capability and location of the AMF. According to an embodiment, the initial AMF may be located in a data center far away from the UE and, in this case, a new AMF may be instantiated using the optimal settings, and the UE may be reallocated to the new AMF. If a particular AMF is removed from the AMF pool, another "empty" AMF may be automatically generated to ensure prompt provisioning for future requests.

Figure 13:
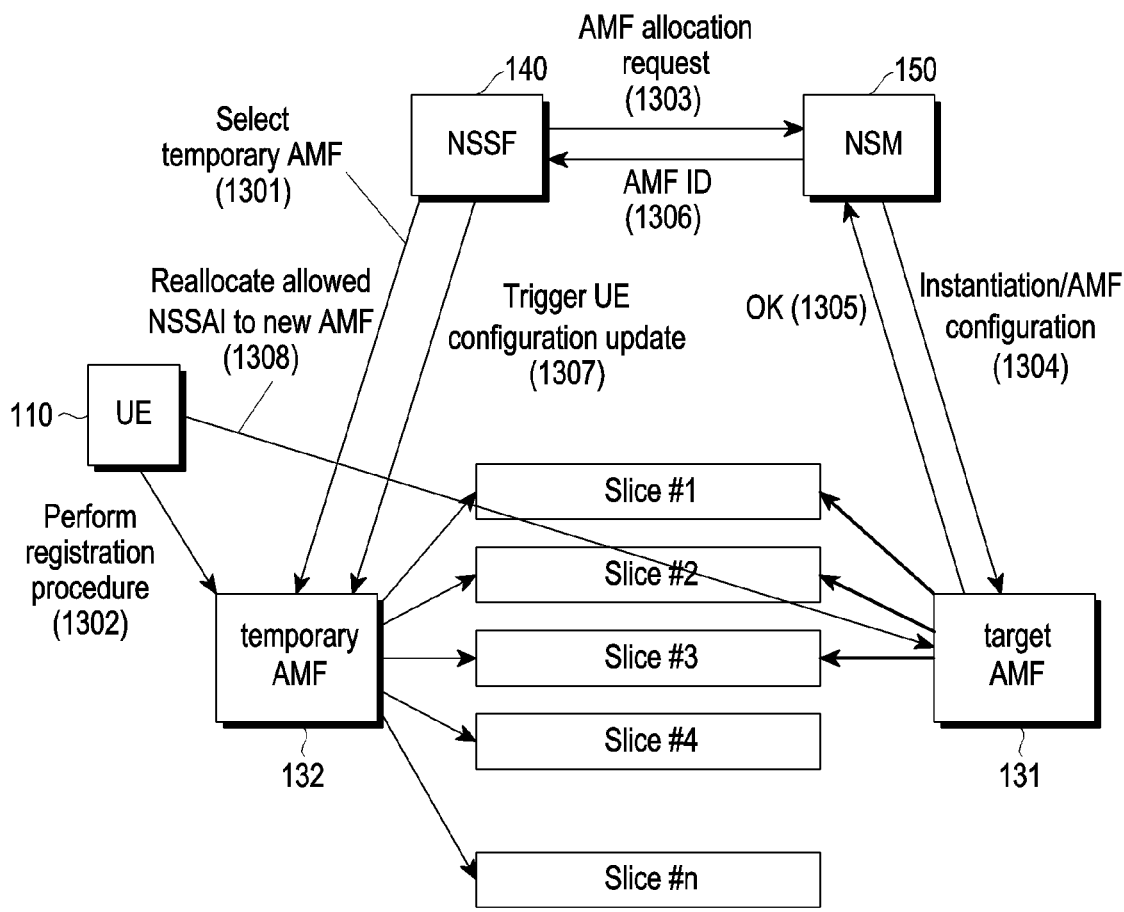
FIG. 13 is a diagram illustrating a method for an NSM 150 to provision an AMF based on a deferred mode according to various embodiments.

FIG. 13 is a diagram illustrating a method for an NSM 150 to provision an AMF based on a deferred mode according to various embodiments.

In order for a UE registration procedure to be performed immediately, the NSM 150 may select one of the existing AMFs as the temporary AMF 132. As the temporary AMF 132, a generic AMF supporting all possible slices, or an AMF supporting the largest available subset of preferred S-NSSAIs may be selected. At the same time, a request for provisioning the target AMF 131 may be triggered. Provisioning of the target AMF 131 may be performed using any one of the methods described above in the disclosure. After provisioning of the target AMF 131 is completed, an AMF relocation procedure for UE reattachment to the target AMF 131 may be initiated.

Referring to FIG. 13, in operation 1301, the NSSF 140 may select the temporary AMF 132 by performing a general UE registration procedure.

In operation 1302, the UE 110 may attach to the temporary AMF 132 and perform a registration procedure.

In operation 1303, the NSSF 140 may request the NSM 150 to allocate an AMF for the requested NSSAI. In operation 1304, the NSM 150 may instantiate or reconfigure the target AMF 131 based on the selected AMF provisioning method and, in operation 1305, may receive a confirm (OK) message from the target AMF 131.

In operation 1306, the NSM 150 may transmit the ID of the target AMF 131 to the NSSF 140 and, in operation 1307, the NSSF 140 may trigger a UE configuration update based on a modification to the NSSAI allowed by the temporary AMF 132.

In operation 1308, the UE 110 may update the allowed NSSAI and reallocate or reattach to the target AMF 131.

According to various embodiments of the disclosure, a method performed by an access and mobility management function (AMF) performing communication may comprise receiving, by the AMF, a registration request message from a user equipment (UE) through a base station, the registration request message including network slice selection assistance information (NSSAI) requested from the UE, identifying, by the AMF, whether the requested NSSAI may be serviced, transmitting, by the AMF, a message for requesting a target AMF capable of servicing the requested NSSAI to a network slice manager (NSM) through a network slicing selection function (NSSF) when the requested NSSAI may not be serviced, and receiving, by the AMF, information regarding the target AMF from the NSM through the NSSF and transmitting the information regarding the target AMF and NSSAI allowed by the target AMF to the base station.

According to an embodiment, transmitting the message for requesting the target AMF may include identifying, by the AMF, whether all single-NASSAIs (S-NASSAIs) of the requested NSSAI are supported, and transmitting, by the AMF, the requested NSSAI to the NSM through the NSSF when all the S-NASSAIs of the requested NSSAI are not supported.

According to an embodiment, the method may further comprise receiving, by the AMF, an update message regarding the target AMF, comparing, by the AMF, an NSSAI serviced by the target AMF with the requested NSSAI, and performing the UE's configuration update when the NSSAI serviced by the target AMF is mapped with the requested NSSAI.

According to an embodiment, the message for requesting the target AMF may include at least one of the requested NSSAI, an S-NSSAI to which the UE subscribed, a home public land mobile network (HPLMN) identity (ID) of the UE, and a tracking area (TA).

According to various embodiments of the disclosure, a method performed by a network slicing selection function (NSSF) performing communication may comprise receiving, by the NSSF, network slice selection assistance information (NSSAI) requested from a UE, from an access and mobility management function (AMF), identifying, by the NSSF, a target AMF capable of servicing the requested NSSAI, requesting, by the NSSF, a network slice manager (NSM) to provision the target AMF when the target AMF capable of servicing the requested NSSAI is not identified and receiving information regarding the target AMF, and transmitting, by the NSSF, the information regarding the target AMF and NSSAI allowed by the target AMF to a base station through the AMF.

According to an embodiment, the method may further comprise selecting, by the NSSF, a temporary AMF capable of servicing the requested NSSAI when the target AMF capable of servicing the requested NSSAI is not identified and transmitting information regarding the selected temporary AMF and NSSAI allowed by the temporary AMF to the base station.

According to an embodiment, requesting the NSM to provision the target AMF may include identifying a mode for provisioning the target AMF, identifying, by the NSSF, the target AMF servicing an S-NSSAI including at least some of the requested NSSAIs when the mode for provisioning the target AMF is identified to be a first mode, and requesting the NSM to provision the target AMF when the target AMF servicing the S-NSSAI including at least some of the requested NSSAIs is not identified.

According to an embodiment, the NSM may be requested to provision the target AMF when the mode for provisioning the target AMF is identified to be a second mode or to be neither the first mode nor the second mode.

According to an embodiment, the target AMF may be determined based on instantiation of a new AMF, reconfiguration of an existing AMF, or a pre-instantiated AMF pool.

According to an embodiment, the method may further comprise receiving a response to accept the request for provisioning the target AMF from the NSM when the mode for provisioning the target AMF is identified to be the first mode.

According to an embodiment, the method may further comprise receiving the response to accept the request for provisioning the target AMF from the NSM when the mode for provisioning the target AMF is identified to be neither the first mode nor the second mode.

According to an embodiment, the method may further comprise updating the AMF when the target AMF is determined by reconfiguration of the existing AMF.

Figure 14:
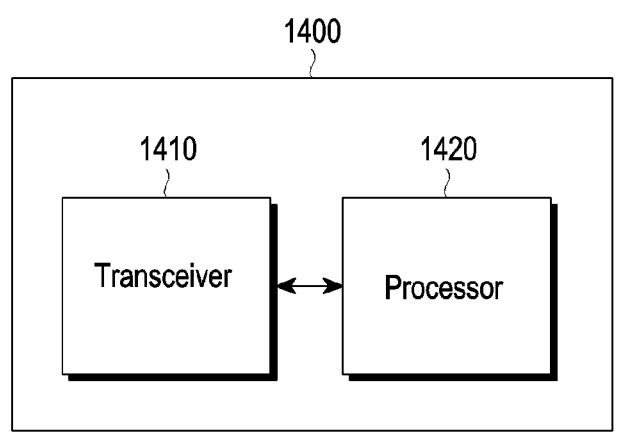
FIG. 14 is a diagram illustrating a configuration of a network entity according to various embodiments.

FIG. 14 is a diagram illustrating a configuration of a network entity according to various embodiments. According to an embodiment, the network entity of FIG. 14 may be any one of the UE 110, the gNB 120, the AMFs 130, 131, and 132, the NSSF 140, the NSM 150, and the NRF 160.

Referring to FIG. 14, a network entity 1400 according to various embodiments may include a transceiver 1410 and at least one processor 1420.

The transceiver 1410 may transmit and receive signals to/from other network entities to perform the methods of the disclosure under the control of the processor 1420. The processor 1420 may perform the overall operation for performing the methods of the disclosure.

According to various embodiments of the disclosure, a device of a network slicing selection function (NSSF) performing communication may comprise a transceiver, and at least one processor controlling an operation of the transceiver. The at least one processor may be configured to receive network slice selection assistance information (NSSAI) requested from a UE, from an access and mobility management function (AMF), identify a target AMF capable of servicing the requested NSSAI, request a network slice manager (NSM) to provision the target AMF when the target AMF capable of servicing the requested NSSAI is not identified and receive information regarding the target AMF, and control the transceiver to transmit the information regarding the target AMF and NSSAI allowed by the target AMF to a base station through the AMF.

According to an embodiment, the at least one processor may be configured to select a temporary AMF capable of servicing the requested NSSAI when the target AMF capable of servicing the requested NSSAI is not identified and control the transceiver to transmit information regarding the selected temporary AMF and NSSAI allowed by the temporary AMF to the base station.

According to an embodiment, the at least one processor may be configured to identify a mode for provisioning the target AMF, identify the target AMF servicing an S-NSSAI including at least some of the requested NSSAIs when the mode for provisioning the target AMF is identified to be a first mode, request the NSM to provision the target AMF when the target AMF servicing the S-NSSAI including at least some of the requested NSSAIs is not identified, and control the transceiver to request the NSM to provision the target AMF when the mode for provisioning the target AMF is identified to be a second mode or to be neither the first mode nor the second mode.

According to an embodiment, the at least one processor may be configured to control the transceiver to request the NSM to provision the target AMF when the mode for provisioning the target AMF is identified to be a second mode or to be neither the first mode nor the second mode.

According to an embodiment, the target AMF may be determined based on instantiation of a new AMF, reconfiguration of an existing AMF, or a pre-instantiated AMF pool.

According to an embodiment, the at least one processor may be configured to control the transceiver to receive a response to accept the request for provisioning the target AMF from the NSM when the mode for provisioning the target AMF is identified to be the first mode.

According to an embodiment, the at least one processor may be configured to control the transceiver to receive the response to accept the request for provisioning the target AMF from the NSM when the mode for provisioning the target AMF is identified to be neither the first mode nor the second mode.

According to an embodiment, the at least one processor may be configured to control the transceiver to update the AMF when the target AMF is determined by reconfiguration of the existing AMF.

Example embodiments of the disclosure have been described above. The above-described embodiments are merely examples, and it will be appreciated by one of ordinary skill in the art various changes may be made thereto without departing from the scope of the present invention. Hence, the methods disclosed herein should be interpreted not as limiting but as illustrative. The scope of the present invention should be construed by the following claims, and all technical spirits within equivalents thereof should be interpreted to belong to the scope of the present invention.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by an access and mobility management function (AMF) for performing a communication, the method comprising:
receiving, by the AMF, a registration request message from a user equipment (UE) through a base station, the registration request message including network slice selection assistance information (NSSAI) requested from the UE;
identifying, by the AMF, whether the requested NSSAI is not served by the AMF;
transmitting, by the AMF, a message for requesting a target AMF capable of servicing the requested NSSAI to a network slice manager (NSM) through a network slice selection function (NSSF) when the requested NSSAI is not served by the AMF;
receiving, by the AMF from the NSM through the NSSF, information regarding the target AMF and an NSSAI allowed by the target AMF; and
transmitting, to the base station, the information regarding the target AMF and the NSSAI allowed by the target AMF,
wherein the target AMF is selected by the NSM that received the message for requesting the target AMF, and a confirm message is sent from the target AMF to the NSM,
wherein the information regarding the target AMF is received by the AMF from the NSM through the NSSF in response to the confirm message, and
wherein the information regarding the target AMF is a set of target AMFs or a candidate AMF.

2. The method of claim 1, further comprising:
identifying, by the AMF, whether a subset of single-NSSAIs (S-NSSAIs) of the requested NSSAI includes S-NSSAIs to which the UE is subscribed; and
transmitting, by the AMF to the NSM through the NSSF, the message for requesting the target AMF capable of servicing the subset of S-NSSAIs of the requested NSSAI when the subset of S-NSSAIs of the requested NSSAI is identified.

3. The method of claim 1, further comprising:
identifying, by the AMF, whether another AMF that serves the requested NSSAI exists; and
transmitting, by the AMF, the message for requesting the target AMF capable of servicing the requested NSSAI when the other AMF that serves the requested NSSAI does not exist.

4. The method of claim 1, further comprising:
receiving, by the AMF, an update message associated with the target AMF;
comparing, by the AMF, an NSSAI serviced by the target AMF with the requested NSSAI; and
updating, by the AMF, a configuration for the UE when the NSSAI serviced by the target AMF is mapped with the requested NSSAI.

5. The method of claim 1, wherein the message for requesting the target AMF includes at least one of the requested NSSAI, an S-NSSAI to which the UE is subscribed, a home public land mobile network (HPLMN) identity (ID) of the UE, or a tracking area (TA).

6. A mobility management function (AMF) device for performing a communication, the AMF device comprising:
a transceiver; and
at least one processor operably coupled to the transceiver, the at least one processor configured to:
receive, from a user equipment (UE) through a base station, a registration request message including network slice selection assistance information (NSSAI) requested from the UE;
identify whether the requested NSSAI is served by the AMF;
transmit, a network slice manager (NSM) through a network slice selection function (NSSF), a message for requesting a target AMF capable of servicing the requested NSSAI to when the requested NSSAI is served by the AMF;
receive, from the NSM through the NSSF, information regarding the target AMF and an NSSAI allowed by the target AMF; and
transmit, to the base station, the information regarding the target AMF and the NSSAI allowed by the target AMF,
wherein the target AMF is selected by the NSM that received the message for requesting the target AMF, and a confirm message is sent from the target AMF to the NSM,
wherein the information regarding the target AMF is received by the AMF from the NSM through the NSSF in response to the confirm message, and
wherein the information regarding the target AMF is a set of target AMFs or a candidate AMF.

7. The AMF device of claim 6, wherein the at least one processor is further configured to:
identify whether a subset of single-NSSAIs (S-NSSAIs) of the requested NSSAI includes S-NSSAIs to which the UE is subscribed; and transmit, to the NSM through the NSSF, the message for requesting the target AMF capable of servicing the subset of S-NSSAIs of the requested NSSAI when the subset of S-NSSAIs of the requested NSSAI is identified.

8. The AMF device of claim 6, wherein the at least one processor is further configured to:
receive an update message associated with the target AMF;
compare an NSSAI serviced by the target AMF with the requested NSSAI; and
update a configuration for the UE when the NSSAI serviced by the target AMF is mapped with the requested NSSAI.

9. The AMF device of claim 6, wherein the message for requesting the target AMF includes at least one of the requested NSSAI, an S-NSSAI to which the UE is subscribed, a home public land mobile network (HPLMN) identity (ID) of the UE, or a tracking area (TA).

* * * * *